United States Patent [19]

Schoen et al.

[11] 4,322,230

[45] Mar. 30, 1982

[54] UNITIZED GAS-PARTICULATE FILTER AND HOUSING

[75] Inventors: Donald W. Schoen, St. Paul; Jerry J. Klug, Rosemount, both of Minn.

[73] Assignee: Donaldson Company, Inc., Minneapolis, Minn.

[21] Appl. No.: 185,344

[22] Filed: Sep. 8, 1980

[51] Int. Cl.³ ............................................ B01D 50/00
[52] U.S. Cl. ....................................... 55/316; 55/387;
 55/498; 55/502; 55/510; 55/DIG. 5; 55/DIG.
 35; 29/455 R; 29/526 R; 29/163.5 F
[58] Field of Search ............... 55/316, 387, 510, 318,
 55/502, 498, DIG. 35, DIG. 5, 512, 513, 482,
 485–488; 128/202.26, 205.28; 210/488–493.1,
 493.2–493.5; 29/455 R, 163.5 F, 526 R

[56] References Cited

U.S. PATENT DOCUMENTS

| | | |
|---|---|---|
| 2,966,234 | 12/1960 | Alexander ............................ 55/501 |
| 2,979,159 | 4/1961 | Pritchard et al. ..................... 55/482 |
| 3,399,516 | 9/1968 | Hough, Jr. et al. .................. 55/487 |
| 3,456,635 | 7/1969 | Hervert ................................ 55/316 |
| 3,727,597 | 4/1973 | Hensler ............................... 55/316 |
| 3,747,303 | 7/1973 | Jordan ................................. 55/387 |
| 3,880,627 | 4/1975 | Morton . | |
| 4,036,616 | 7/1977 | Byrns .................................. 55/514 |
| 4,139,354 | 2/1979 | Giles ................................... 55/387 |
| 4,148,120 | 4/1979 | Siebels ............................. 29/455 R |
| 4,227,904 | 10/1980 | Kasmark, Jr. et al. ............... 55/316 |

FOREIGN PATENT DOCUMENTS

| | | | |
|---|---|---|---|
| 545089 | 5/1942 | United Kingdom .................. 55/513 |
| 1220174 | 1/1971 | United Kingdom .................. 55/510 |
| 1322718 | 7/1973 | United Kingdom .................. 55/487 |

*Primary Examiner*—Bernard Nozick
*Attorney, Agent, or Firm*—Merchant, Gould, Smith, Edell, Welter & Schmidt

[57] ABSTRACT

A filter assembly (10) for the filtration of toxic gases from the air is disclosed, which includes a unitized cylindrical housing having oppositely disposed end covers (11, 12), with an inlet port (11a) in one end cover and an outlet port (13a) in the side wall. An annular, pleated filter element (21) extends between the end covers (11, 12) between perforated liners (18, 19), and a third, perforated liner (20) is spaced outwardly from the center or common liner (19) to provide an annular space therebetween which is filled with activated charcoal (27). Fines media (25, 26) are positioned on opposite sides of the activated charcoal (27). The first, pleated filter (21) and the second, charcoal filter (27) are thus mounted contiguous to one another on opposite sides of separating wall (19, 25), and extend between the end covers (11, 12) to provide filtration for air being drawn through the filter unit.

7 Claims, 3 Drawing Figures

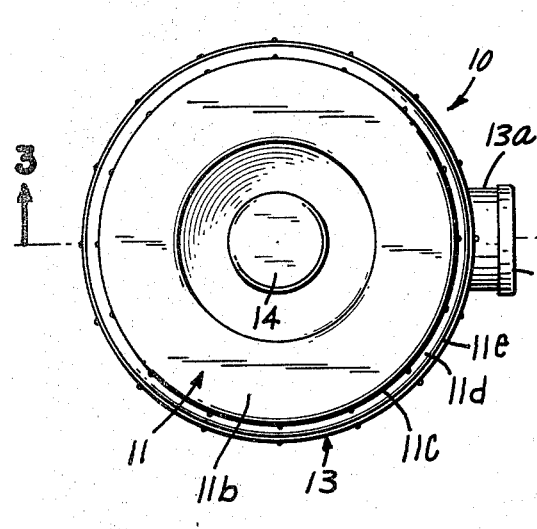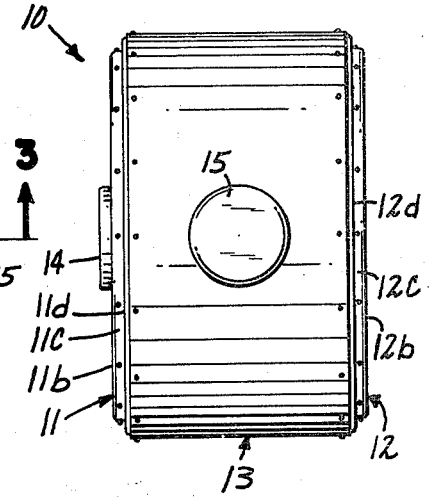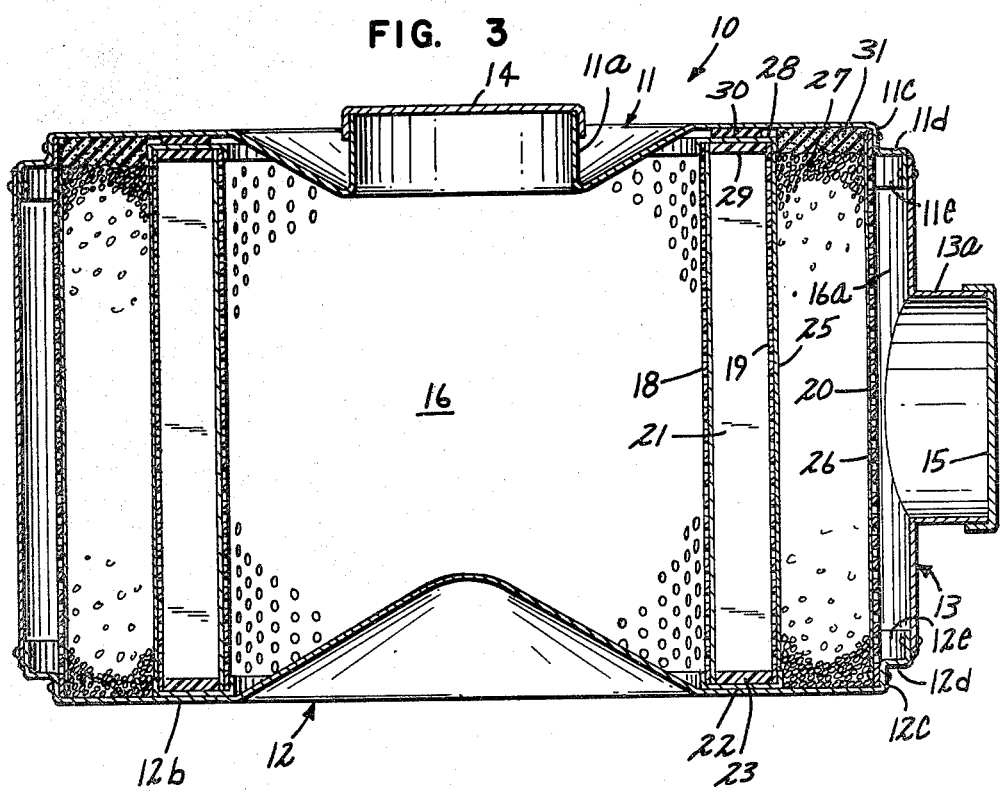

UNITIZED GAS-PARTICULATE FILTER AND HOUSING

TECHNICAL FIELD

This invention relates to a filter unit having both a particulate filter and a charcoal gas filter, and more particularly relates to a unit in which the housing is integrally related with the filters such that the unit can be hermetically sealed for storage and is disposable after being used.

BACKGROUND OF THE INVENTION

Activated charcoal filters are made available at many military installations, civilian defense installations and in many military vehicles, to be used in the event the occupants are exposed to toxic agents such as poisonous gases. Such filters, prior to installation and use, must be stored in hermetically-sealed containers to prevent degredation of the charcoal. After exposure to toxic agents, the charcoal filters become saturated and must be removed and replaced. In a prior art design presently in use, a pleated particulate flter and a charcoal gas filter were mounted within a permanent housing by means including an outer retaining cover and an inner retaining cover. The covers sealed and retained the separate filters in the housing and permitted replacement of the filters. After usage of the prior art filter unit, it was necessary to decontaminate the housing and covers before new filters were installed. Such procedure was time consuming and costly.

BRIEF SUMMARY OF THE INVENTION

The present invention provides a unitized construction in which the housing is integrally associated with the filters. The housing has an intermediate wall portion which is generally cylindrical in shape and is provided with end covers which are mounted coaxially therewith about a longitudinal axis extending therethrough. An inlet opening is provided in one end cover and an outlet opening is provided in a side wall of the housing. The inlet and outlet opening can be covered to provide a hermetically sealed unit which can be stored for a long period of time. Disposed in the air flow path between the inlet and outlet openings and mounted between the end covers coaxially therewith, in spaced relationship to the intermediate wall portion, is a composite, cylindrical filter member comprising at least two different types of filter media. The unique construction includes an annular, pleated particulate filter which is surrounded by an annular charcoal gas filter, the two filters being contiguous to one another on opposite sides of a common separating wall which is permeable to the passage of the fluid medium being filtered. The unique construction permits the unit to be quickly and easily manufactured at relatively low cost. As a result, the complete unit is disposable, thus eliminating the need to decontaminate the housing after the filter unit is used.

BRIEF DESCRIPTION OF THE DRAWINGS

FIG. 1 is a top plan view of the filter unit;

FIG. 2 is a plan view from one side of the filter unit; and

FIG. 3 is an enlarged sectional view taken along line 3—3 of FIG. 1.

DESCRIPTION OF THE PREFERRED EMBODIMENT

Referring now to the drawings, wherein like reference numerals are used throughout the several views to indicate like elements of the invention, there is disclosed a filter unit or assembly 10 which includes a unitized outer housing having a pair of spaced, oppositely disposed end covers 11 and 12 coaxially mounted on the opposite ends of an intermediate housing member 13 which is generally cylindrical in shape. The two end covers 11 and 12 are identical parts except that an axial air inlet tube or port 11a is provided in one of the covers. Each cover 11 and 12 is generally circular in shape and has a center portion surrounded by a generally planar, annular land region 11b, 12b, at the outer edge of which is a cylindrical shoulder 11c, 12c having at its outer edge an annular ring portion 11d, 12d which lies in a plane parallel to the corresponding land region 11b, 12b, and which has at its outer edge a depending cylindrical flange 11e, 12e. The flanges 11e, 12e constitute peripheral edge portions of the end covers which in the preferred embodiment are riveted to the opposite, circular ends of the cylindrical intermediate housing member 13. An outlet tube or port 13a is mounted in an opening in the wall of housing member 13. For storage purposes, the inlet port 11a and the outlet port 13a are provided with cover members 14 and 15 which can be secured and sealed thereto to hermetically seal the filter unit.

Mounted within filter unit 10 are first, second and third cylindrical, perforated filter media supporting wall members 18, 19 and 20 each of which has a first end positioned adjacent end cover 12 and a second end positioned adjacent end cover 11 so that the perforated wall members extend between the end covers and are disposed between the inlet and outlet ports. In the preferred embodiment, each of the wall members 18, 19 and 20 is a perforated metal liner which is relatively rigid and which provides support both for the housing and the filter media.

Positioned between wall members 18 and 19 is a pleated particulate filter 21, which is preferably constructed from filter paper or other non-woven media, and which is formed into a tubular or cylindrical shape to fill the space between the wall members 18 and 19.

Wall members 18 and 19 are supported in a spaced relationship at a first end adjacent end cover 12 by means of an annular metal end cap 22 having a generally U-shaped cross section. End cap 22 is bonded or sealed by means of epoxy or other sealing material to land region 12b adjacent the center portion of end cover 12. Wall members 18 and 19 are positioned within end cap 22 adjacent its side walls, end cap 22 is filled with a plastisol material 23, and the pleated filter 21 is positioned between the perforated wall members with its first end extending into the plastisol 23, which then hardens to hold the wall members and filter element in place.

The third perforated wall member 20 is riveted at its first end to the cylindrical shoulder 12c so that it is positioned at the outer edge of the land region 12b spaced from second wall member 19. A fines media 25, preferably in the form of a cotton cloth material comprising a fine mesh, is mounted around the outside of second wall member 19 to cover its entire outer surface, and another fines media 26 of similar nature is mounted around the inside of third wall member 20 to cover its entire inner surface. The fines media or fines filters 25 and 26 can be held in place against the wall members by suitable adhesive material so that they will not be displaced as the filter unit as assembled.

The annular space between the filters 25 and 26 is then filled with granules or pieces of activated charcoal 27.

The second ends of the wall members 18 and 19 are also positioned within an annular end cap 28 having a U-shaped cross-section, which is also filled with a plastisol material 29 to secure together the wall members, end cap 28 and filter media 21. The first filter means comprising the wall members 18, 19, end caps 22, 28, and pleated filter 21 is normally assembled as a unit before mounting it in the housing.

To complete the assembly, a flexible, annular gasket 30, preferably made of rubber or the like, is placed on top of end cap 28, and a flexible, annular compression pad 31 is installed over the activated charcoal 27 between wall members 19 and 20. The compression pad 31 is preferably made of foam rubber or the like and is designed to be compressed between the activated charcoal and the end cover 11 so that it expands as the charcoal settles to hold it in place and prevent air leakage between it and the charcoal.

After the first and second type filter media 21 and 27 are installed on end cover 12 as described, and the gasket 30 and compression pad 31 are installed, end cover 11 is then placed over the filters, and the second end of wall member 20 is riveted to shoulder 11c. The compression of gasket 30 between end cap 29 and land region 11b holds the adjacent end of wall members 18 and 19 in place. The resulting structure thus has filter means which are generally cylindrical in shape and which are mounted within the housing cavity 16 between the oppositely disposed land regions 11b, 12b, coaxially therewith. The intermediate housing member 13 is then slipped over the end covers and flange 11e is riveted to one end of intermediate housing member 13 and flange 12e to the other end.

The purpose of the fines media 25 and 26 is to prevent migration of activated charcoal particles through the perforated wall members 19 and 20. The resulting filter unit 10 can be hermetically sealed by placing cover members 14 and 15 over the inlet and outlet ports. The filter unit 10 can then be stored until it is needed. When it is desired to utilize the activated charcoal to filter out toxic agents from air being introduced into an installation or vehicle, the covers 14 and 15 are removed and the filter unit 10 is placed in position to filter the incoming air. The air is drawn into the internal cavity 16 within filter unit 10 through inlet port 11a, and is then drawn through the pleated filter element 21 and the activated charcoal 27 before being discharged through outlet port 15. It is noted that an annular chamber 16a is provided between housing 13 and wall member 20 which provides a path for the air being discharged from the filters to flow toward outlet 13a. The contaminated air first passes through the pleated filter 21, which removes particulate material from the air to prevent it from reaching the activated charcoal. If such particulate material is permitted to reach the charcoal the majority will pass through the charcoal carrying toxic contaminants with it. The pleated filter also prevents particulate matter from covering the charcoal and reducing its effectiveness in adsorbing toxic material. The activated charcoal is thus protected and made more effective in adsorbing toxic agents or gases from the air passing therethrough. Filter unit 10 is disposable so that when the charcoal is saturated and no longer effective, the entire unit can the thrown away and replaced by a new unit. The present invention thus overcomes the disadvantages of the prior art filter units while at the same time retaining the necessary filtration capacity.

What is claimed is:

1. A disposable filter assembly comprising:
   (a) a unitized outer housing enclosing an internal cavity, comprising:
      (i) a pair of spaced, oppositely disposed end covers, each defining a peripheral edge portion;
      (ii) An intermediate housing member continuously extending around and interconnected said peripheral edge portions of said pair of end covers;
      (iii) inlet and outlet ports formed in said outer housing and opening into said internal cavity thereof;
   (b) filter means disposed between said inlet and outlet ports within said internal cavity and mounted to said outer housing for filtering a fluid medium passing between said inlet and outlet ports; said filter means comprising first and second type filter media mounted contiguous to one another on opposite sides of a separating wall, said separating wall being permeable to the passage of the fluid medium being filtered;
   (c) said first type filter media comprising a particulate air filter media adjacent said inlet, said second type filter media comprising an activated charcoal media adjacent said outlet, and said separating wall comprising a perforated sheet material having fines media attached thereto for preventing migration of said activated charcoal media thereacross; and
   (d) removable cover members for said inlet and outlet ports to hermetically seal the filter unit.

2. The structure of claim 1, wherein said outer housing is generally cylindrical in shape, with said end covers being coaxially mounted within said intermediate housing portion, and wherein said inlet port is formed through one of said end covers and said outlet port is formed through said intermediate housing member.

3. The structure of claim 1, wherein said filter means is disposed within said internal cavity such that said separating wall thereof extends in the direction between said spaced end covers, wherein said inlet port is formed through one of said end covers and said outlet port is formed through said intermediate housing member; and including seal means operatively mounted between said filter means and said oppositely disposed end covers for sealing the junctures of said filter means with said end covers from passage of the fluid medium being filtered, therebetween.

4. A filter assembly comprising, in combination:
   (a) a unitized housing, comprising a pair of oppositely disposed end covers and an intermediate wall portion peripherally surrounding and continuously interconnecting said end covers, to define an internal cavity;
   (b) inlet and outlet ports formed through said housing and opening into said internal cavity thereof;
   (c) a composite filter member within said housing cavity, between said inlet and outlet ports, having opposite end portions; said filter member comprising at least two different types of filter media, separated by and sharing a common wall;
   (d) sealing means between said opposite end portions of said filter element and said end covers; and (e) means including a filter media retaining wall compressibly holding said filter member and sealing means between said end covers.

5. The filter assembly as recited in claim 4, wherein said composite filter member comprises a particulate air filter media and an activated charcoal media separated by said common wall; and wherein said common wall comprises a material permeable to the passage of a fluid media being filtered by said filter therethrough, and includes a fines media for preventing migration of said charcoal media to said particulate filter media.

6. The filter assembly as recited in claim 5, wherein said housing is generally cylindrical in shape with said end covers being mounted coaxially within said intermediate wall portion about a longitudinal axis extending therethrough; wherein said composite filter member is generally cylindrical in shape and is coaxially mounted about said axis within said housing cavity in spaced relationship with said intermediate wall portion of said housing; and wherein said inlet port is formed through one of said end covers and said outlet port is formed through said housing wall portion.

7. An integrated disposable filter assembly comprising:
 a pair of spaced, oppositely disposed end covers, each defining a peripheral edge;
(b) a plurality of spaced, perforated filter media supporting wall members extending between said end covers, with at least one of said wall members being rigidly secured to said end covers;
(c) filter means mounted between said end covers comprising a first porous media filter mounted contiguous to a second activated charcoal filter on opposite sides of one of said wall members;
(d) an intermediate housing member spaced from said filter means and continuously extending over said peripheral edge portions between said pair of end covers;
(e) inlet and outlet ports formed in one of said end covers and said intermediate housing member;
(f) said intermediate housing member being generally cylindrical in shape, with said end covers being coaxially mounted within said intermediate housing member, said inlet port being formed through one of said end covers and said outlet port being formed through said intermediate housing member, said end covers defining oppositely disposed generally planar annular land regions, and said filter means being generally cylindrical inshape and being mounted between said oppositely disposed annular land regions, coaxially therewith; and
(g) said cylindrical filter means comprising first, second, and third cylindrical perforated wall members extending between said end covers, said first porous media filter being mounted between said first and second wall members, and said activated charcoal media being mounted between said second and third wall members, and wherein fines media are mounted between said activated charcoal and said second and third wall members.

* * * * *